(12) United States Patent
Fowler et al.

(10) Patent No.: US 10,215,302 B2
(45) Date of Patent: Feb. 26, 2019

(54) REGULATING OPERATION OF A DRIVE ASSEMBLY FOR MANUAL OVERIDE OF AN ACTUATOR

(71) Applicant: Natural Gas Solutions North America, LLC, Houston, TX (US)

(72) Inventors: Robert Erling Fowler, Houston, TX (US); Kurt Douglas Regenbrecht, Halletsville, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 0 days.

(21) Appl. No.: 15/361,429

(22) Filed: Nov. 27, 2016

(65) Prior Publication Data

US 2018/0149282 A1 May 31, 2018

(51) Int. Cl.
*F16H 19/00* (2006.01)
*F16K 31/05* (2006.01)
*F16K 31/04* (2006.01)

(52) U.S. Cl.
CPC .......... *F16K 31/05* (2013.01); *F16H 19/001* (2013.01); *F16K 31/043* (2013.01)

(58) Field of Classification Search
CPC ..... F16H 3/08; F16H 3/20; F16H 3/22; F16H 3/24; F16H 3/34; F16K 31/043; F16K 31/44; F16K 31/445; F16K 31/524
USPC ...... 74/625; 251/129.03, 129.13, 249.5, 251, 251/254
See application file for complete search history.

(56) References Cited

U.S. PATENT DOCUMENTS

| | | | | |
|---|---|---|---|---|
| 2,630,832 A | * | 3/1953 | Lutherer | F16K 17/168 137/553 |
| 2,848,904 A | * | 8/1958 | Wilson | F16K 31/055 251/129.03 |
| 3,309,942 A | * | 3/1967 | Caldwell | F16H 37/00 74/527 |
| 4,261,224 A | * | 4/1981 | Sulzer | F16D 41/088 192/223.2 |
| 4,454,504 A | * | 6/1984 | Jocz | F16K 31/048 340/665 |
| 4,616,803 A | * | 10/1986 | Schils | F16H 1/16 251/14 |

(Continued)

*Primary Examiner* — Jake Cook
*Assistant Examiner* — Bobby Rushing, Jr.
(74) *Attorney, Agent, or Firm* — Paul Frank + Collins P.C.

(57) ABSTRACT

An actuator with an override device to avoid damage to components during transition to and from manual operation and during manual operation. In one embodiment, the actuator comprises an output shaft, a drive assembly coupled with the output shaft, the drive assembly comprising a motor and a brake, an override device coupled with the output shaft, the override device comprising a gear assembly and a switch actuator, and a housing forming an enclosure about at least the gear assembly and the switch actuator. The switch actuator can be configured to modify an external input to the drive assembly in response to relocation of the gear assembly relative to the output shaft between a first position and a second position so as to disconnect the motor from the external input at the first position, disconnect both the motor and the brake from the external input at the second position, and apply the external input to the brake during transition between the first position and the second position.

7 Claims, 22 Drawing Sheets

(56) References Cited

U.S. PATENT DOCUMENTS

| | | | | |
|---|---|---|---|---|
| 6,003,837 A | * | 12/1999 | Raymond, Jr. | F16K 31/055 251/129.03 |
| 6,186,162 B1 | * | 2/2001 | Purvis | D06F 39/081 122/504.2 |
| 6,343,615 B1 | * | 2/2002 | Miller | A62C 35/68 137/202 |
| 6,953,084 B2 | * | 10/2005 | Greeb | E21B 34/02 166/332.1 |
| 9,568,116 B2 | * | 2/2017 | Chen | F16H 1/203 |

\* cited by examiner

REGULATING OPERATION OF A DRIVE ASSEMBLY FOR MANUAL OVERIDE OF AN ACTUATOR

BACKGROUND

Engineers expend great efforts to make devices easy to assemble, reliable to operate, and amenable to maintenance and repair tasks. These efforts may result in features on the device that can foreclose the need to rely on experience or diligence of individuals that perform these tasks.

SUMMARY

The subject matter of this disclosure relates to automation. Of particular interest are automated devices that mechanically operate a process device, for example, to adjust flow of material (e.g., fluids). These automated devices, or "actuators," may include components that drive movement of the process device. This automated drive may operate in response to an input, typically an electrical, pneumatic, or hydraulic signal. Actuators may also include components to allow an end user to manually adjust the process device. This manual drive may prove useful in absence of the input due to, for example, power outage or other problematic conditions that prevail at the actuator or its installed location.

Some embodiments can regulate the input to the automated drive in coordination with use of the manual drive to operate the process device. These embodiments may integrate features to interface with circuitry (e.g., electrical circuitry, pneumatic circuitry, etc.) that directs the input to the components of the automated drive. These features may, for example, cause the circuitry to energize and de-energize the automated drive so as to correspond with use or non-use of the manual drive. In this way, the embodiments can avoid damage to components of both the manual drive and automated drive.

BRIEF DESCRIPTION OF THE DRAWINGS

Reference is now made briefly to the accompanying figures, in which.

Figure 1:
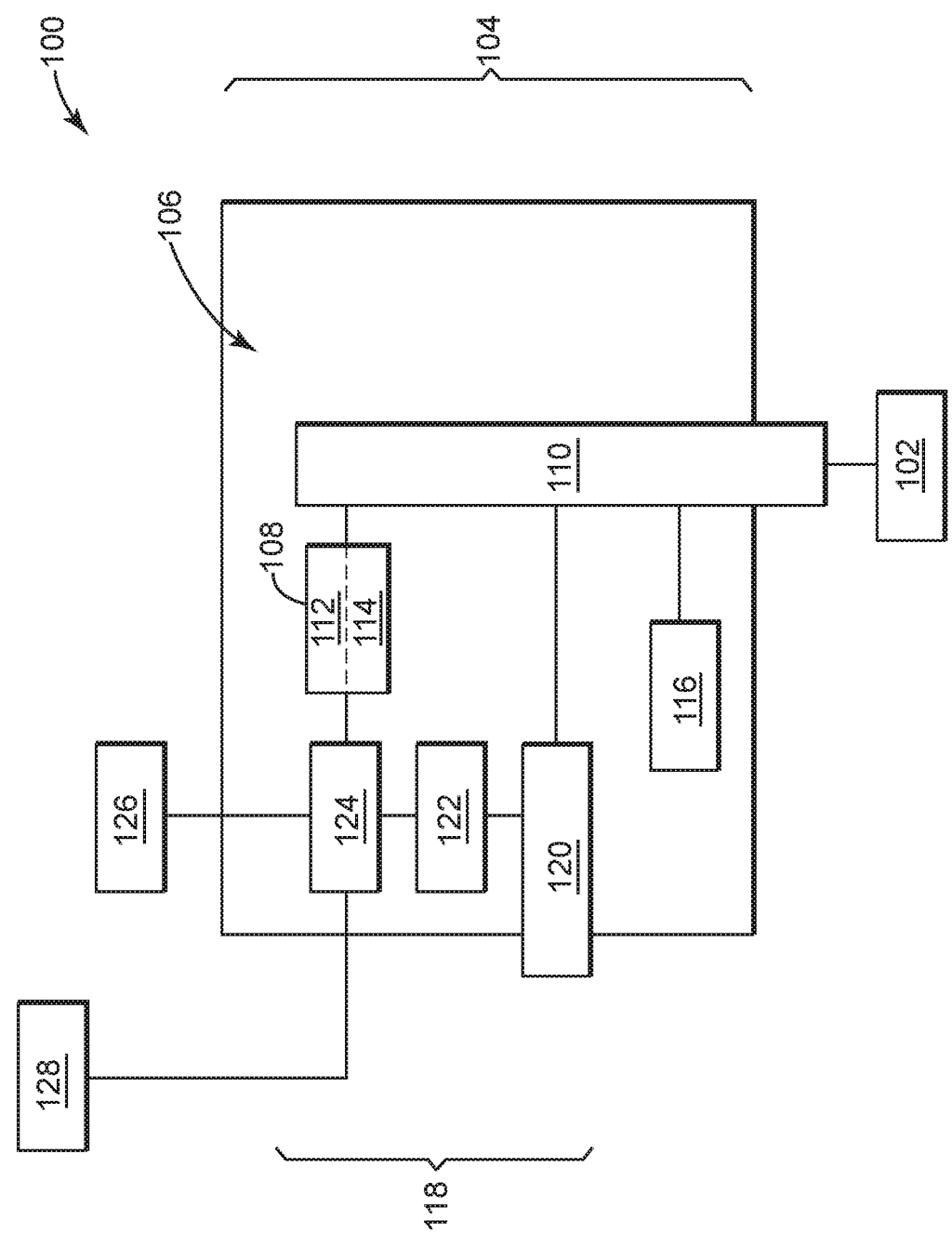
FIG. 1 depicts a schematic diagram of an exemplary embodiment of an actuator.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion herein describes various embodiments of an actuator. The embodiments may take the form of a spring-return actuator, shown and described below, although other types of actuators may benefit from implementation of the concepts herein. In one implementation, this spring-return actuator may be configured to allow an end user to operate the device with a manual drive. These configurations may also regulate input power to drive components that operate the actuator. These functions may occur simultaneously to avoid damage to the actuator. Other embodiments are within the scope of the subject matter.

FIG. 1 depicts a schematic diagram of an exemplary embodiment of an actuator 100. This embodiment may be useful to operate a process device, shown generally and enumerated by the numeral 102. The actuator 100 may have a housing 104 that forms an interior cavity 106. Various operating components may reside in the interior cavity 106. These operating components may include a drive assembly 108 that rotates an output shaft 110 to operate the process device 102. An electric motor 112 and a brake 114 may be useful for this purpose. The operating components may also include an energy storage device 116 to provide a load on with the output shaft 110. The energy storage device 116 may include a spring with coils that circumscribe the output shaft 110. This spring can "discharge" to cause the output shaft 110 to configure the process device 102 in a safe condition, for example, in response to loss of power or other operating difficulties with the drive assembly 108. Other devices that can provide the load may include compressions springs, pneumatic charges, and batteries that provide current to the motor 112 and the brake 114, as desired.

The actuator 100 may find use in applications to actuate dampers, valve assemblies, and like devices with moveable elements to control flow of material (e.g., solids, liquids, gasses, etc.). In one implementation, the actuator 100 may include an override device 118 to allow an end user (e.g., a technician) to manually operate the output shaft 110. The override device 118 may include a manual drive 120 that couples with the output shaft 110 and with a switch actuator 122. In use, the switch actuator 122 can interact with operating circuitry 124, which itself couple with the motor 112 and the brake 114, as well as with one or more system devices, noted here as a power supply 126 and a process controller 128.

Broadly, the override device 118 is configured to manage operation of the drive assembly 108 between automated and manual operation of the actuator 100. These configurations may cause the operating circuitry 124 to regulate an external input to each of the motor 112 and the brake 114 in response to use of the manual drive 120. Examples of the external input include current (and voltage) that may arise from the power supply 126 to that energize one or both of the electric motor 112 and the brake 114. This feature can allow the end user to operate the manual drive 120 without concern for whether or not the motor 112 is energized or the output shaft 110 is under load from the loading member 116. As an added benefit, operation of the override device 118 may generate a signal (also "feedback signal") to the process controller 128 to alert the system that the manual drive 120 is in use to manually operate the output shaft 110.

The manual drive 120 can be configured for the end user to manipulate the output shaft 110. These configurations may include components on the interior and the exterior of the housing 104. On the exterior, the manual drive 120 can provide implements to receive a force from the end user. These implements may couple with components inside the housing 104 to transfer this force to the output shaft 110. In this way, the end user can utilize the manual drive 120 to operate the process device 102.

The switch actuator 122 can be configured to respond to the force from the end user. These configurations may include devices that set the actuator 100 among different operating modes. Examples of the operating modes may correspond with use and non-use of the manual drive 120 as well as the transition therebetween. Use of the manual drive 120 preferably requires an end user to turn a handwheel or like implement to move the output shaft 110. On the other hand, non-use 120 of the manual drive 110 is likely when the actuator 100 actuates automatically without interaction by the end user.

Devices for use as the switch actuator 122 may incorporate switching technology inside the housing 104. This technology may actuate contemporaneously with operation of the manual drive 120, possibly by way of a mechanical interface that leverages movement of the manual drive 120 to change states on a switch or switches. Electrical interfaces are also contemplated in lieu of such mechanics. In use, the switch actuator 122 can set the operating mode of the actuator 100 to reflect operating conditions of the manual drive 120. One operating mode may indicate a condition on the actuator 100 that the manual drive 120 is in use and engaged with the output shaft 110. As noted above, this condition may coincide with actions by the end user to operate the actuator 100 via the manual drive 120. Another operating mode may indicate a condition in which the manual drive 120 is not in-use ("non-use") and disengaged from the output shaft 110. This condition is preferable for the actuator 100 to operate automatically under the external input and without interference from the end user. Of further interest, the switch actuator 122 can also set the operating mode for the actuator 100 to indicate a condition in which the manual drive 120 is transitioning between, for example, being engaged and disengaged with the output shaft 110. In one implementation, the signal that indicates the condition of the actuator may be used for both this "transition" condition and the "manual" condition on the actuator 100.

Figure 2:
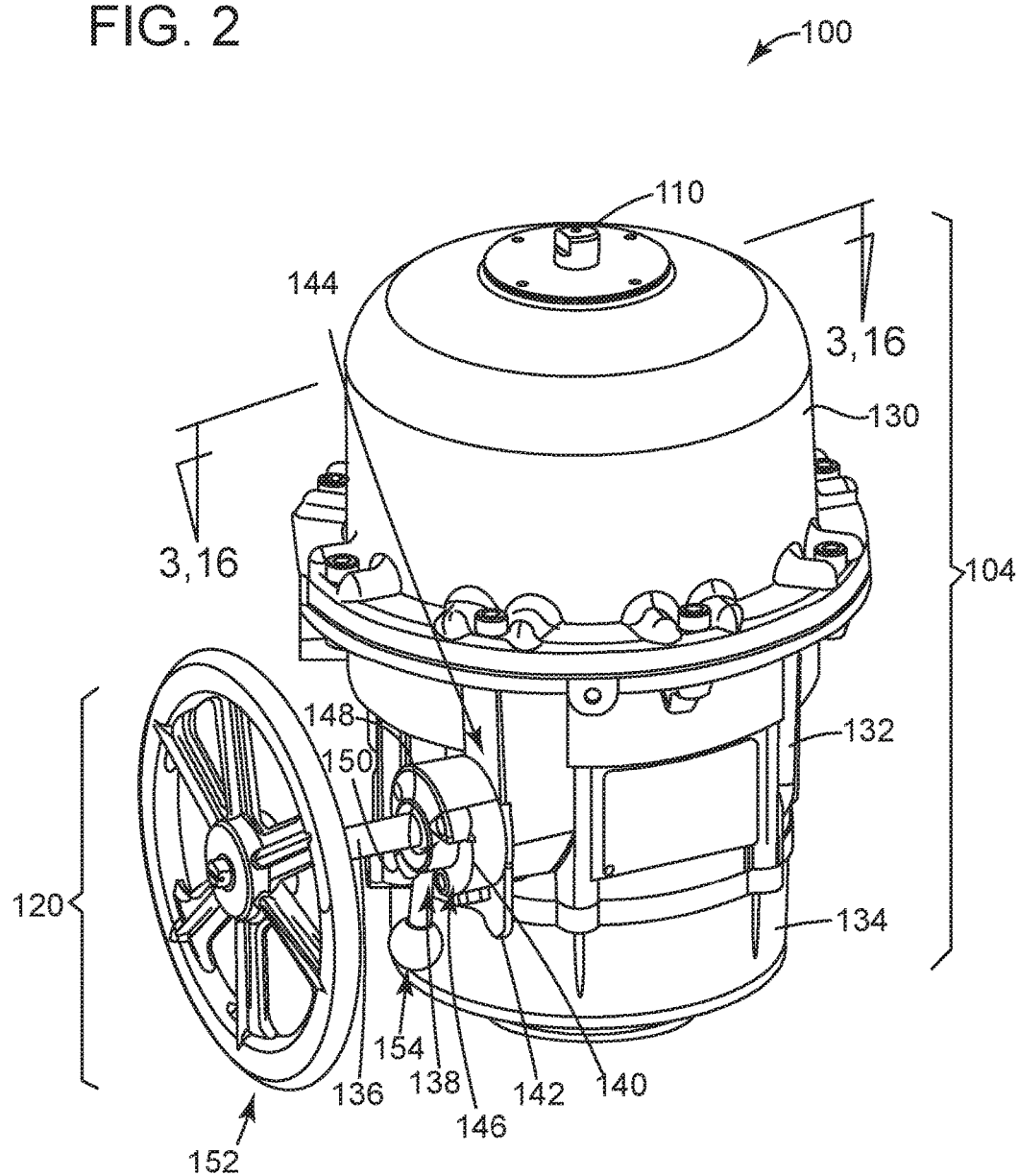
FIG. 2 depicts a perspective view of an example of the actuator of FIG. 1.

FIG. 2 depicts a perspective view from the top of an example of the actuator 100. The housing 104 can be configured as an enclosure to seal and protect its internal components. This enclosure can be generally cylindrical with multiple housing members (e.g., a first housing member 130, a second housing member 132, and a third housing member 134). Each of the housing members 130, 132, 134 can assume a form factor according to this cylindrical shape, but these form factors may also comport with functional feature necessary for use of the actuator 100 in its application. Construction of the housing members 130, 132, 134 should be robust so that the enclosure can resist high pressures, high temperatures, corrosion, and similar harsh conditions. The construction may leverage metals (e.g., steels) as cast or machined piece parts that readily assemble together.

The manual drive 120 operates to transfer force from outside to inside of the enclosure. This device may include a shaft 136 that extends into a gear assembly 138 that is disposed primarily in the enclosure of the housing 104. The device may also include a hard stop 140 that may couple via a mounting bracket 142 to a mounting area 144 on the exterior of the second housing member 132. The hard stop 140 may include an open region 146 that terminates at a pair of surfaces (e.g., a first surface 148 and a second surface 150). As shown in FIG. 2, a part of the gear assembly 138 may extend through the hard stop 140. The manual drive 120 may also include a pair of input devices (e.g., a first input device 152 and a second input device 154). The input devices 152, 154 can include implements accessible from the outside of the housing 104. These implements may allow the technician to actuate parts of the gear assembly 138. The first input device 152 may embody a handwheel that couples with a first end of the shaft 136. The second input device 154 may comprise a lever that couples with the part of the gear assembly 138 that is disposed in the hard stop 140. This configuration can locate the lever 154 in the open region 146.

Figure 3:
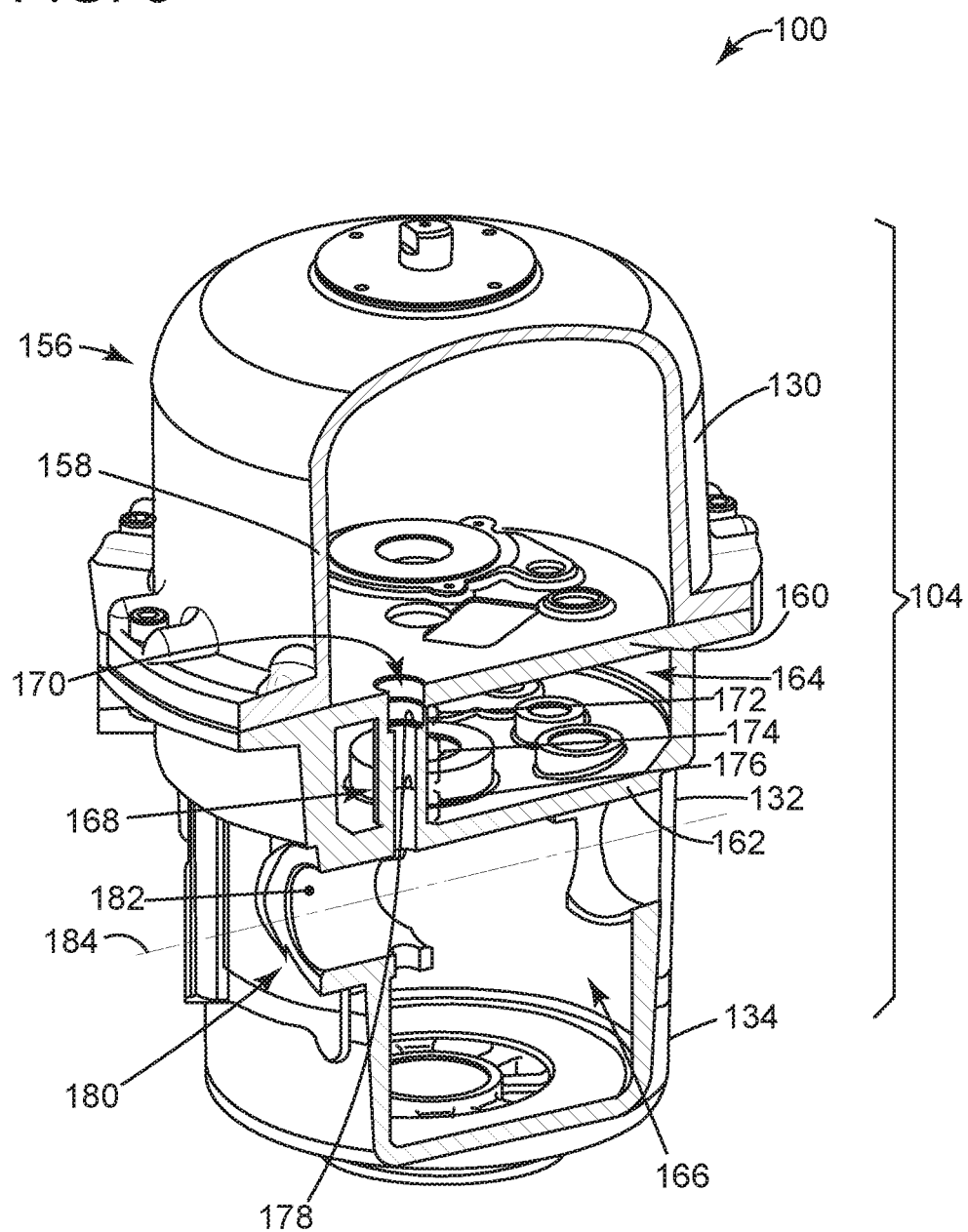
FIG. 3 depicts a perspective view of the cross-section of the actuator of FIG. 2.

FIG. 3 depicts a perspective view of the cross-section of the actuator 100 taken at line 3-3 of FIG. 2. The actuator 100 is in partially-assembled form with many components are removed to focus the discussion on one construction for the housing 104. In this construction, the housing members 130, 132, 134 may have a body 156 that has a peripheral wall 158 with a generally annular configuration to form part of the cylindrical enclosure. The housing may also include a pair of planar walls (e.g., a first planar wall 160 and a second planar wall 162) disposed in the interior cavity 106. The planar walls 160, 162 may be constructed to couple on the periphery with the peripheral wall 158. This construction may be formed integrally or as a separate piece that secures in place with fasteners (e.g., screws, bolts, welds, etc.). The second planar wall 162 may bifurcate the interior cavity 106 into at least two parts (e.g., a first part 164 and a second part 166). A boss 168 may extend from the second planar wall 162 into the first part 164. The boss 168 may form an aperture 170 having open ends at each of the parts 164, 166 of the interior cavity 106. The aperture 170 may have one or more sections (e.g., a first section 172, a second section 174, and a third section 176). Each of the sections 172, 174, 176 can define different dimensions (e.g., diameter). These dimensions may form shoulders 178 between adjacent sections 172, 174, 176. In the second part 166, the peripheral wall 158 may form a support structure 180 with a first bore 182 having a first axis 184. As noted more below, the support structure 180 may be configured to receive parts of the gear assembly 138 (FIG. 2).

Figure 4:
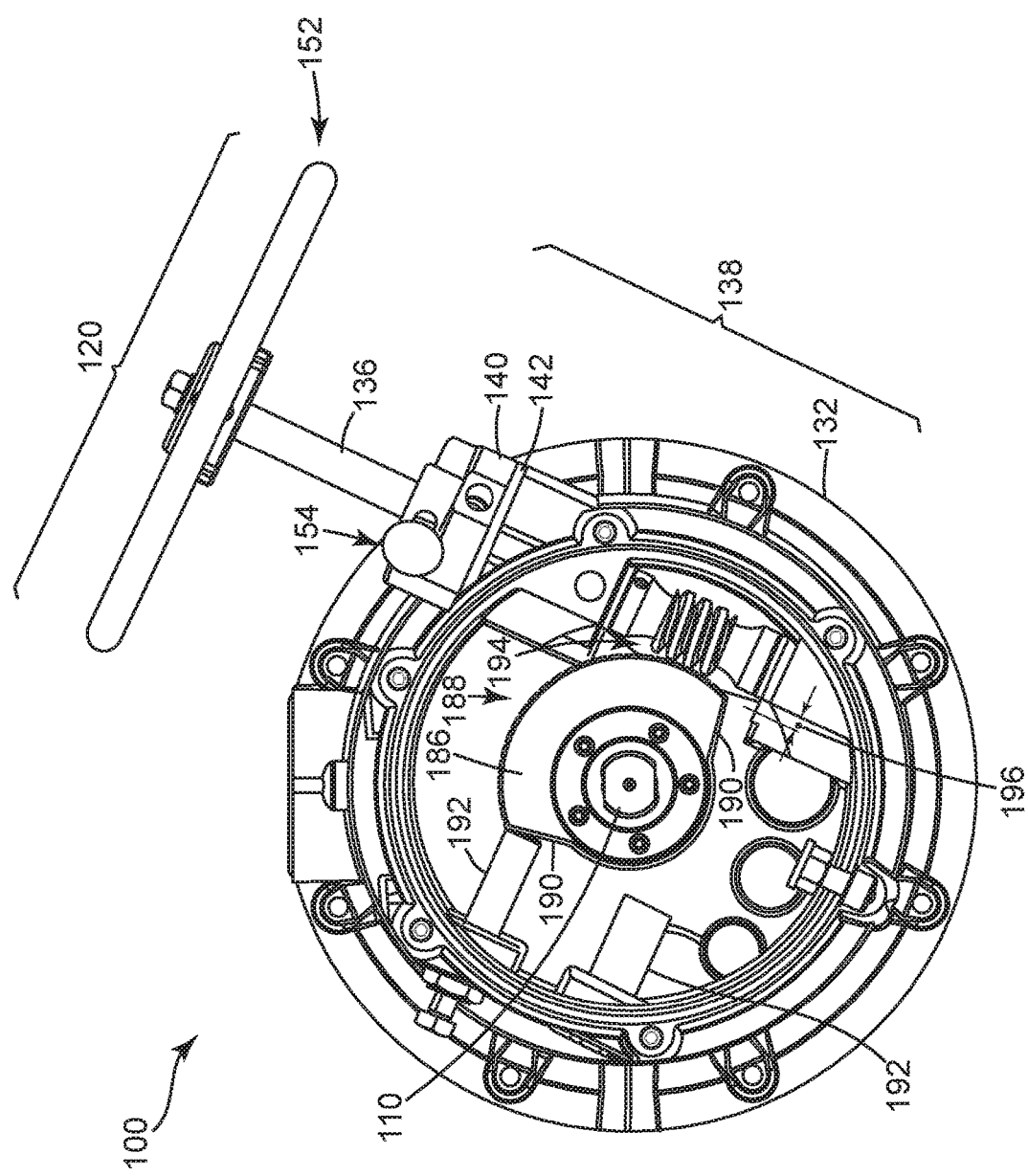
FIG. 4 depicts a plan view of the bottom of the actuator of FIG. 2 in partially-assembled form.

FIG. 4 shows a plan view of the bottom of the actuator 100 of FIG. 2 in partially-assembled form. The lower or bottom housing member 110 (FIG. 2) and other components are hidden to reveal the interior cavity 106. The gear assembly 138 may insert into the first bore 182 to reside in the support structure 180. As also shown in FIG. 4, the actuator 100 may include a driven gear 186 that couples with the output shaft 110. The driven gear 186 may have a driven gear section 188 forming an arcuate portion that terminates at ends 190. Preferably, the arcuate portion may be dimensioned so that the ends 190 are in position to contact one of a pair of end-of-travel stops 192. This structure is useful to stop rotation of the output shaft 110 in response to the torsion loading from the loading member 116 (FIG. 1). The gear assembly 138 may include a drive gear section 194 that resides in a position proximate the driven gear section 188 on the driven gear 186. This position may form a gap 196 between the gear sections 188, 194.

Actuation of the lever 154 may adjust the size of the gap 196 to engage and disengage the teeth in the gear sections 188, 194. For example, the lever 154 may be moveable to relocate of the gear assembly 138 relative to the output shaft 110 between a first position and a second position, one each where the teeth in gear sections 188, 194 are disengaged and engaged with one another. This feature can connect the motor 112 at the first position, disconnect both the motor 112 and the brake 114 at the second position, and apply the brake 112 during transition between the first position and the second position. In the normal or automated operating mode of the actuator 100 (or "non-use" of the manual drive 120, the gap 196 is configured for clearance between the gear sections 188, 194. This configuration disengages the gear sections 188, 194 so that the motor 112 (FIG. 1) operates the output shaft 110 under power. Manipulating the lever 154 reduces the gap 196 to engage the gear sections 188, 194. This configuration changes the actuator 100 to its manual operating mode (or "use" of the manual drive 120) to permits the end user to rotate the output shaft 110 with the handwheel 152.

Figure 5:
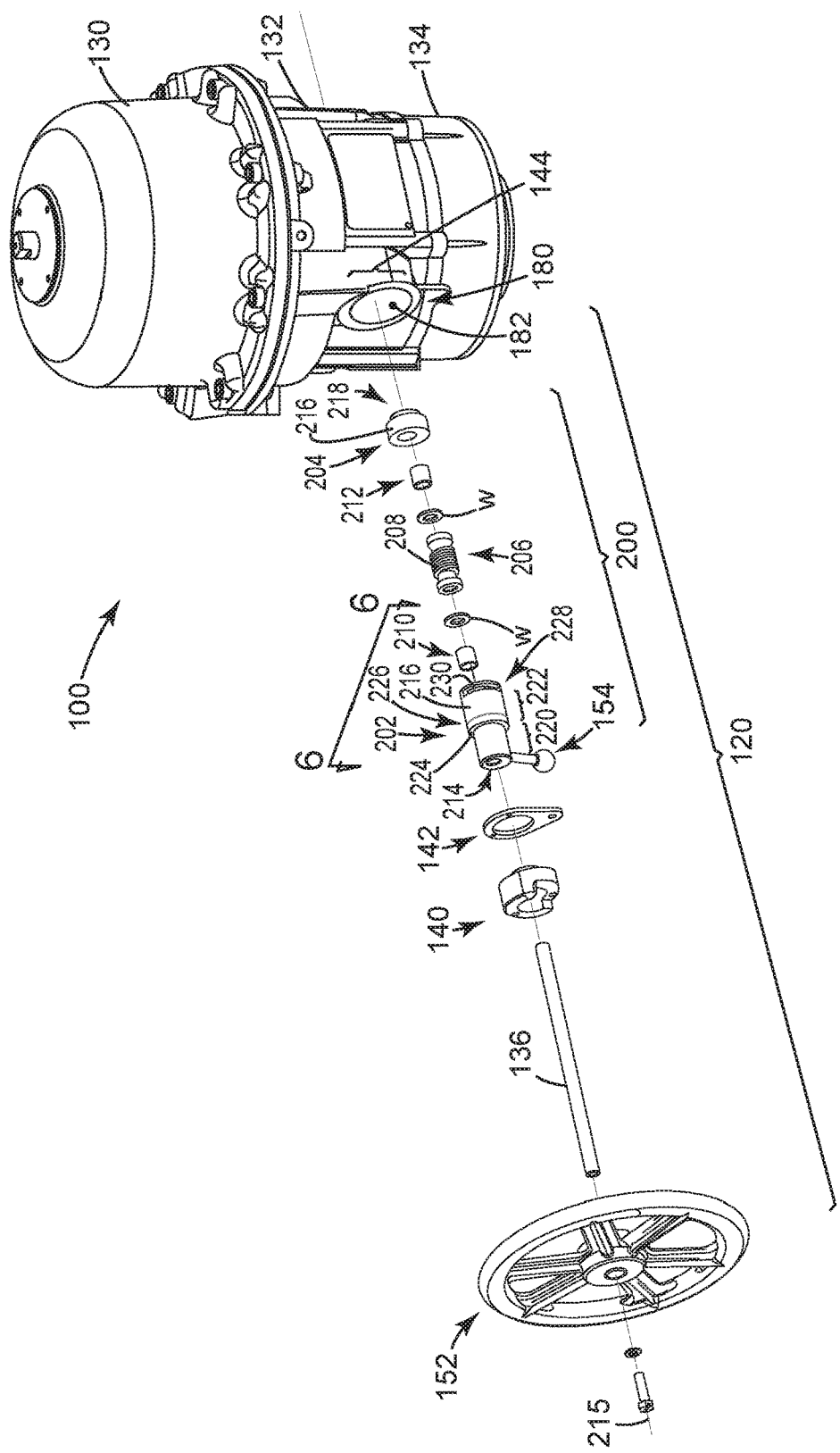
FIG. 5 depicts a perspective view of the actuator of FIG. 2 in partially-exploded form.

FIG. 5 shows a partially-exploded view of the assembly of the actuator 100 of FIG. 2 to illustrate an example of a gear assembly 200. This example may include a pair of bearings (e.g., a first bearing 202 and a second bearing 204) and a drive gear 206. The drive gear 206 may include gear teeth 208 that are, for example, complimentary to teeth found in the gear section 188 (FIG. 4) on the driven gear 186 (FIG. 4) to form a gear drive. Examples of this gear drive can be arranged as a worm gear. As also shown in FIG. 5, the bearings 202, 204 may incorporate a bushing (e.g., a first bushing 210 and a second bushing 212). The bushings 210, 212 may embody a sleeve bearing that reduces sliding friction to facilitate rotating motion. The assembly may also include additional bearings W, which are show here disposed on either side of the drive gear 206, as desired. Collectively, the components of the drive assembly 200 may form a second bore 214 with a second axis 215. The shaft 136 can extend through the second bore 214 to position a second end resident in the second bearing 204. A pin or set screw may be useful to engage the drive gear 206 with the shaft 136. Integral components and features may also work.

As also shown in FIG. 5, the bearings 202, 204 may have a generally cylindrical body 216 with a diameter that fits into the first bore 182. The fit may be snug, but not interference, to allow the bearings 202, 204 to rotate relative to the support structure 180 of the second housing member 132. On the second bearing 204, the body 216 may have a reduced-dimensioned end 218. The first bearing 202 may benefit from the body 216 being configured with different diameter sections (e.g., a first section 220 and a second section 222). This configuration can form a shoulder 224. The first section 220 may be configured to receive the lever 154, as shown. Suitable configurations may utilize an aperture with threads complimentary to threads on the lever 154. On the second section 222, the cylindrical body 216 may host one or more recesses (e.g., a first recess 226 and a second recess 228). The first recess 226 may operate as a groove within dimensions sufficient to receive a gasket or o-ring (not shown). The second recess 228 may form a profiled surface 230 that at least partially circumscribes the periphery of the first bearing 202. In operation, use of the lever 154 to rotate the first bearing 202 changes both the radial orientation of the profiled surface 230 and the size of the gap 196 (FIG. 4). The changes, in turn, cause the switch actuator 122 (FIG. 1) to set the operating mode for the actuator 100 to correspond with engagement and disengagement of the gear sections 188, 196 (FIG. 4).

Figure 6:
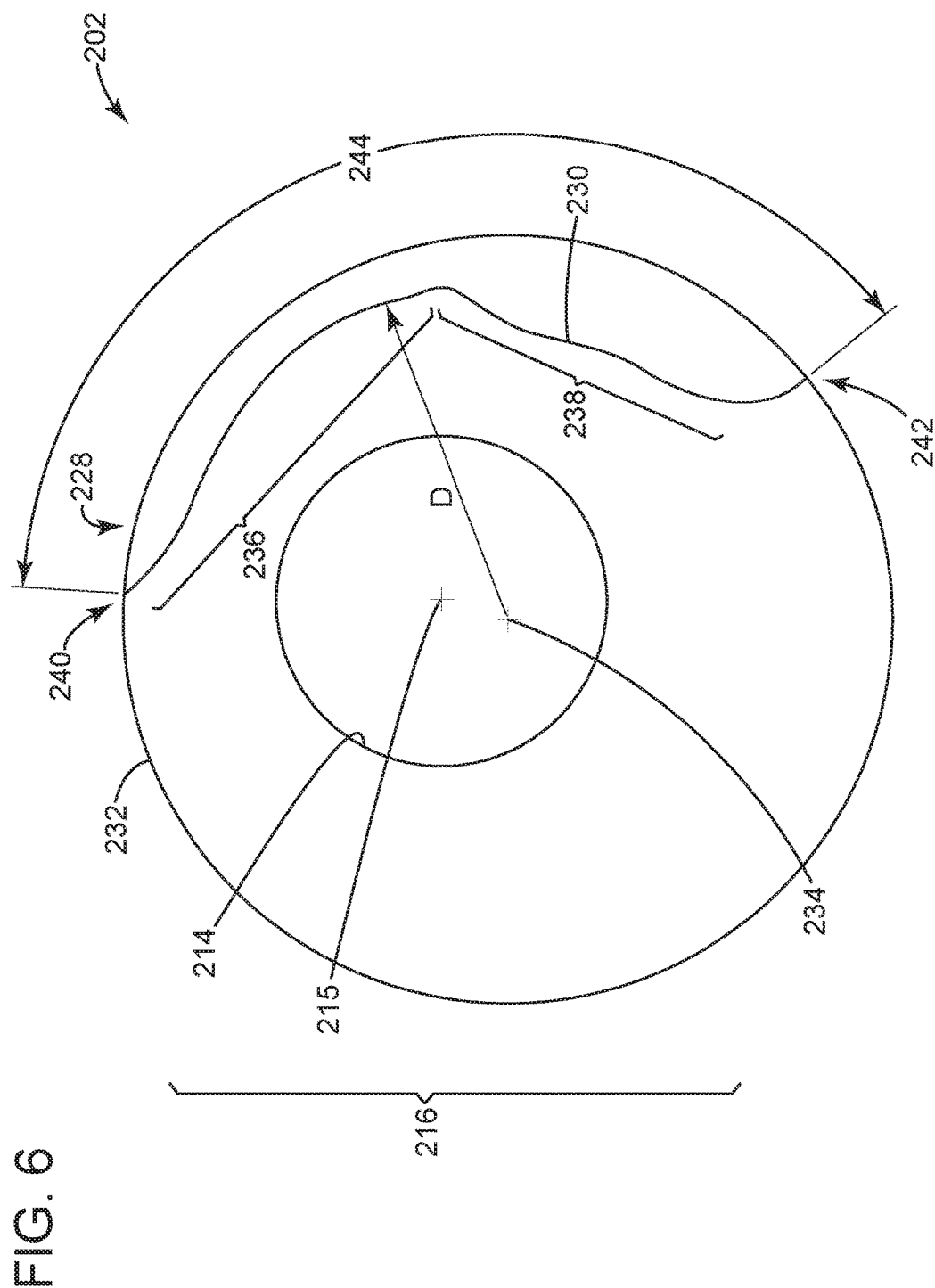
FIG. 6 depicts a plan view of the cross-section of the actuator of FIG. 2.

FIG. 6 depicts an elevation view of the cross-section of the first bearing 202 taken at line 6-6 of FIG. 5. The cylindrical body 216 may have an outer surface 232 that circumscribes a center 234. The second recess 228 may penetrate the outer surface 232 to form the profiled surface 230 with one or more curved sections (e.g., a first curved section 236 and a second curved section 238). The curved sections 236, 238 may terminate at points (e.g., a first point 240 and a second point 242) on the outer surface 232. The points 240, 242 may be annularly offset from one another by a radial dimension 244. Values for the radial dimension 244 may be less than 180°, but this value may vary as necessary. In one implementation, the curved sections 236, 238 may be defined according to a dimension D as measured from the center 234.

Figure 7:
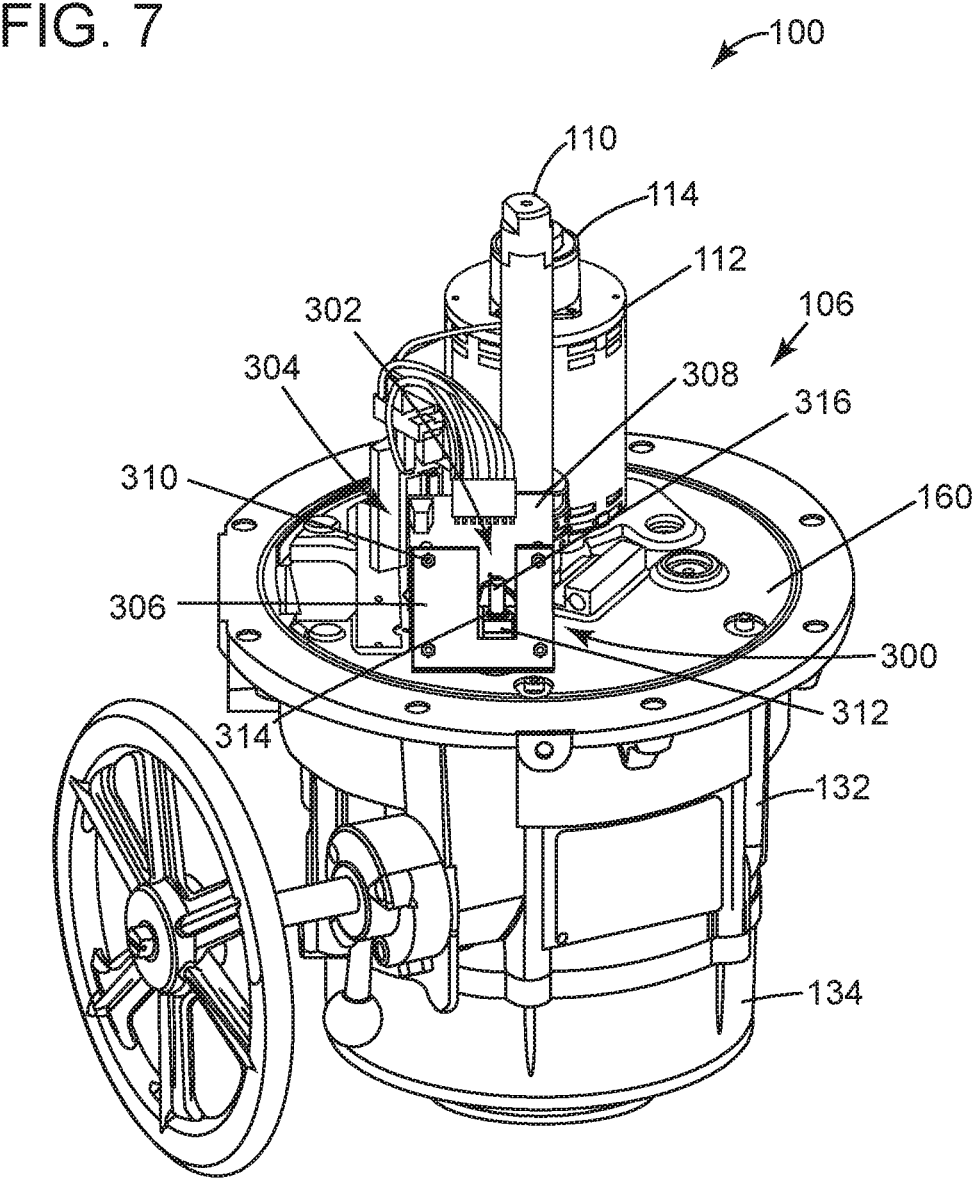
FIG. 7 depicts a perspective view of the actuator of FIG. 2 in partially-assembled form to illustrate an example of a switch actuator.

FIG. 7 shows a partially-assembled view of the actuator 100 of FIG. 2 to illustrate an example of a switch actuator 300. The first housing member 130 (FIG. 5) is removed from this view to reveal the interior cavity 106. The switch actuator 300 may include a switching member 302 that interacts with a board assembly 304 to change the operating mode of the actuator 100. The board assembly 304 may include a bracket 306 that couples with a switch board 308. Components like standoffs 310 may be used to mount and isolate the switch board 308, as necessary. In one implementation, the bracket 306 may operate as a support to locate the switch board 308 in position, for example, on the first planar wall 160 disposed within the housing 104. This support may comprise thin, sheet metal or like material that can be bent, punched, formed, or otherwise machined with geometry that is suitable for this purpose. The geometry may include a bent tab 312 with aperture 314. In one implementation, the switching member 302 may include an elongated rod 316 that fits into the aperture 314. The elongated rod 316 may extend through the first planar wall 160 into the second housing member 132.

Figure 8:
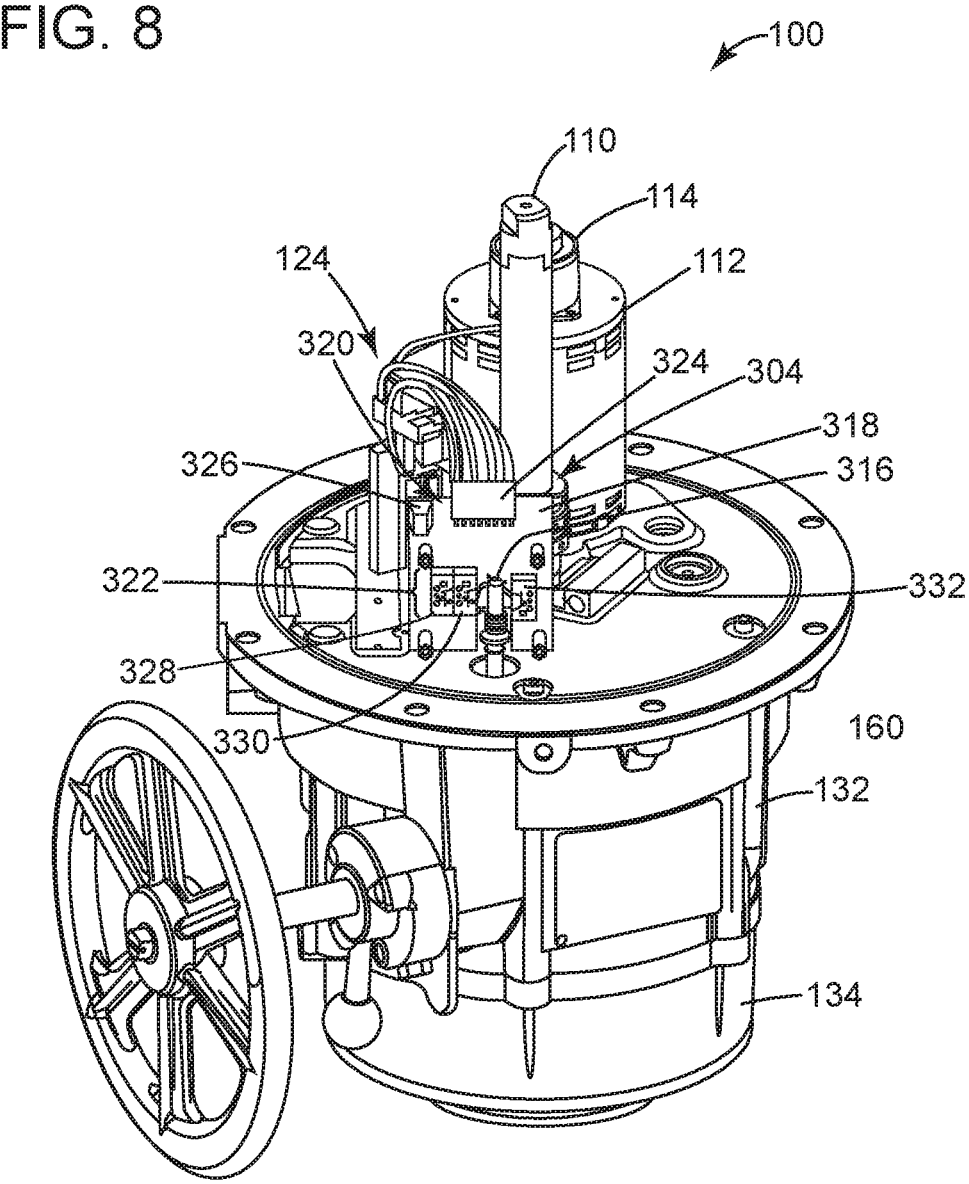
FIG. 8 depicts a perspective view of the actuator of FIG. 7 in partially-assembled form.

FIG. 8 shows the actuator of FIG. 7 with the bracket 306 removed for clarity. The switch board 308 may have a circuit board 318, typically a printed circuit board, although flexible circuits and related "flex" technology may also suffice. The circuit board 318 may support an input/output 320 and a switch 322. The input/output 320 may include a pair of connectors (e.g., a first connector 324 and a second connector 326) that couple the switch 322 with the operating circuitry 124 (as well as the power supply 126 and the remote process controller 128 noted in connection with FIG. 1). Where necessary, the switch 322 may comprise a plurality of switches (e.g., a first switch 328, a second switch 330, and a third switch 332). The switches 328, 330, 332 may embody devices that are configured for different "states" to regulate current as part of an electrical circuit. These devices may include toggles, push-buttons, and like actuators that change state in response to contact. However, other devices like optical switches, beam-break switches, and other non-contact devices may also be used in the contemplated designs. In one implementation, the position of the switches 328, 330, 332 on the circuit board 318 may be offset (e.g., vertically) relative to one another. This feature is useful to regulate timing of actuation between the states on individual switches 328, 330, 332. The offset may require the elongated rod 316 to change its position (e.g., elevation) in order to contact the switches 328, 330, 332. In one implementation, the offset corresponds with a sequence of actuation for the switches 328, 330, 332. This sequence regulates the power input to the motor 112 and the brake 114.

Figure 9:
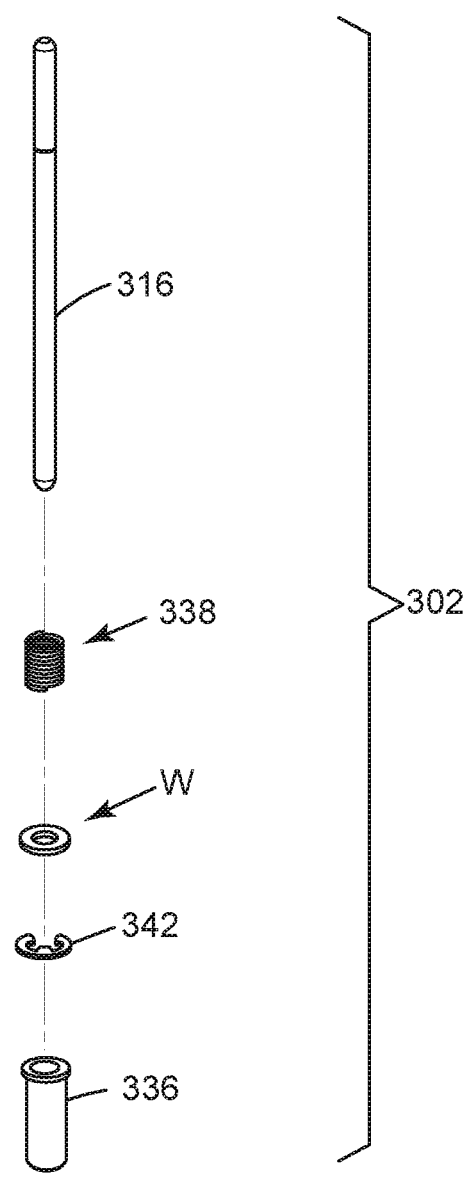
FIG. 9 depicts a perspective view of an example of a switching member in exploded form, the switch member finding use in the switch actuator of FIG. 7.

FIG. 9 shows just the switching member 302 in exploded form to further the discussion of this component. At a high level, this switching member 302 may include pieces to direct movement and bias position of the elongate rod 316. All of these pieces may not be necessary for operation or may be arranged differently, as desired. In this example, the pieces may include one or more bushings (e.g., a bushing 336). The bushing 336 may include sliding bearings that insert into complimentary features on the second housing member 132 (FIG. 8). These bearings are effective to reduce sliding friction due to displacement of the elongated rod 316. The example also includes a return mechanism to bias the position of the elongate rod 316. This mechanism may include one or more springs (e.g., a first spring 338). Wound compression springs may be useful for this purpose, but extension springs, spring steel, and like resilient materials may operate to provide sufficient bias to move the elongated rod 316. The return mechanism may also include one or more washers W and retaining devices 342, possibly e-clips and like devices that secure to the elongated rod 316 or feature of the second housing member 132 (FIG. 8). These devices can maintain the position of bushing 336 and the spring 338 in the actuator 100.

Figure 10:
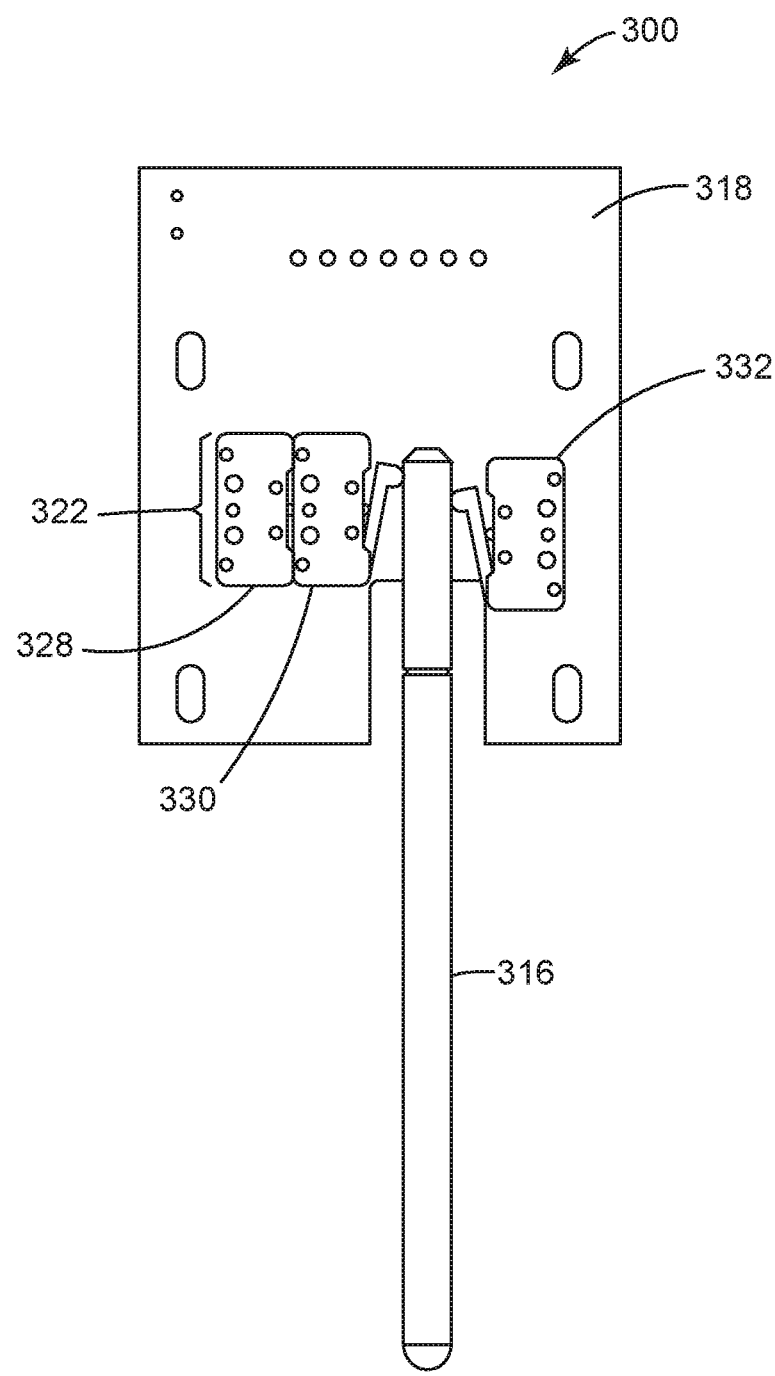
FIG. 10 depicts an elevation view of an example of the switch actuator of FIG. 7.
Figure 11:
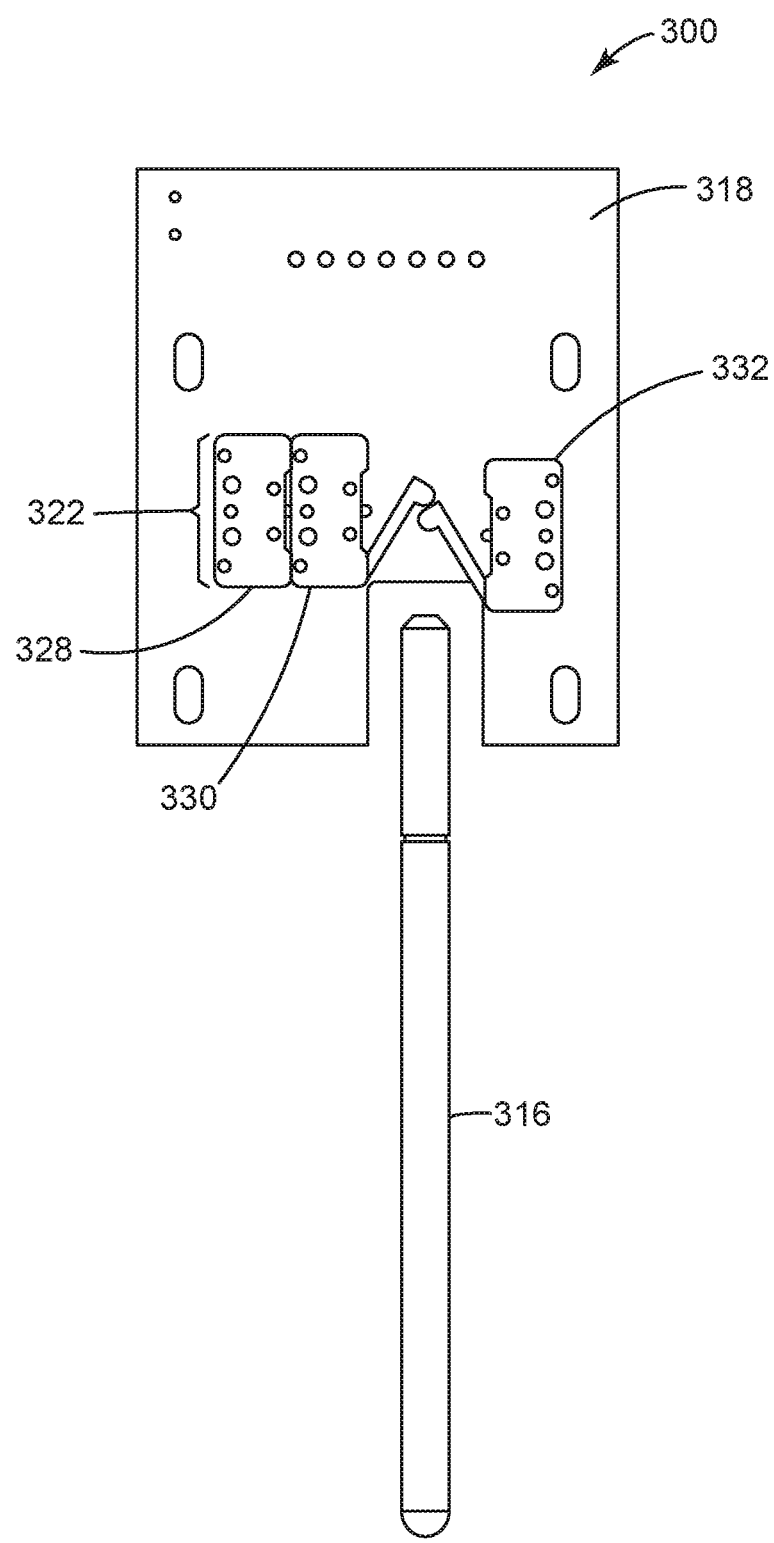
FIG. 11 depicts an elevation view of an example of the switch actuator of FIG. 7.
Figure 12:
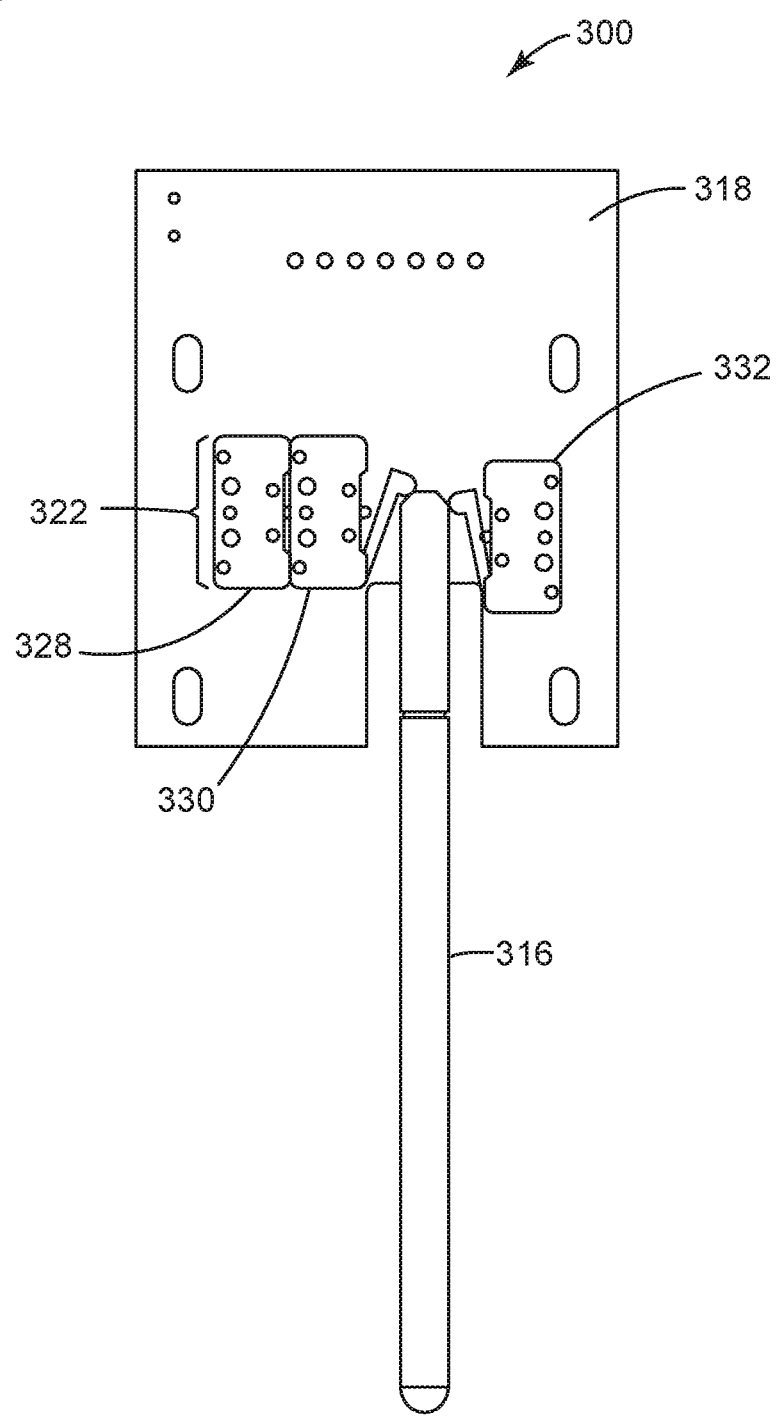
FIG. 12 depicts an elevation view of an example of the switch actuator of FIG. 7.

FIGS. 10, 11, and 12 depict an elevation view of the actuator 100 of FIG. 2 in partially-assembled form to focus on movement of the switch actuator 300. These figures are useful to describe the interaction between the profiled surface 230 (FIG. 6) on the first bearing 202 (FIG. 6) with the elongated rod 316 of the switch actuator 300 in response to the changes in position of the lever 154. These changes may cause linear displacement of the elongated rod 316.

FIG. 10 shows the elongated rod 316 at a first elevation relative to the switches 328, 330, 332. This first elevation may correspond with a first radial position of the lever 154. In one implementation, the end of the elongated rod 316 may reside on the profiled surface 230 in the section of the second recess 228 that is "shallowest" relative to the outer surface 232. The dimension D may be largest at this position or section. In one example, the elongated rod 316 may reside on the outer surface 232. FIG. 11 shows the elongated rod 316 at a second elevation relative to the switches 328, 330, 332. This second elevation may correspond with a second radial position of the lever 154. In one implementation, the end of the elongated rod 316 may reside on the profiled surface 230 in the section of the second recess 228 that is "deepest" relative to the outer surface 232. The dimension D may be smallest at this section. FIG. 12 shows the elongated rod 316 at an intermediate elevation, between the first elevation and the second elevation. This intermediate elevation may correspond with positions that the lever 154 assumes to transition between the first radial position and the second radial position.

Figure 13:
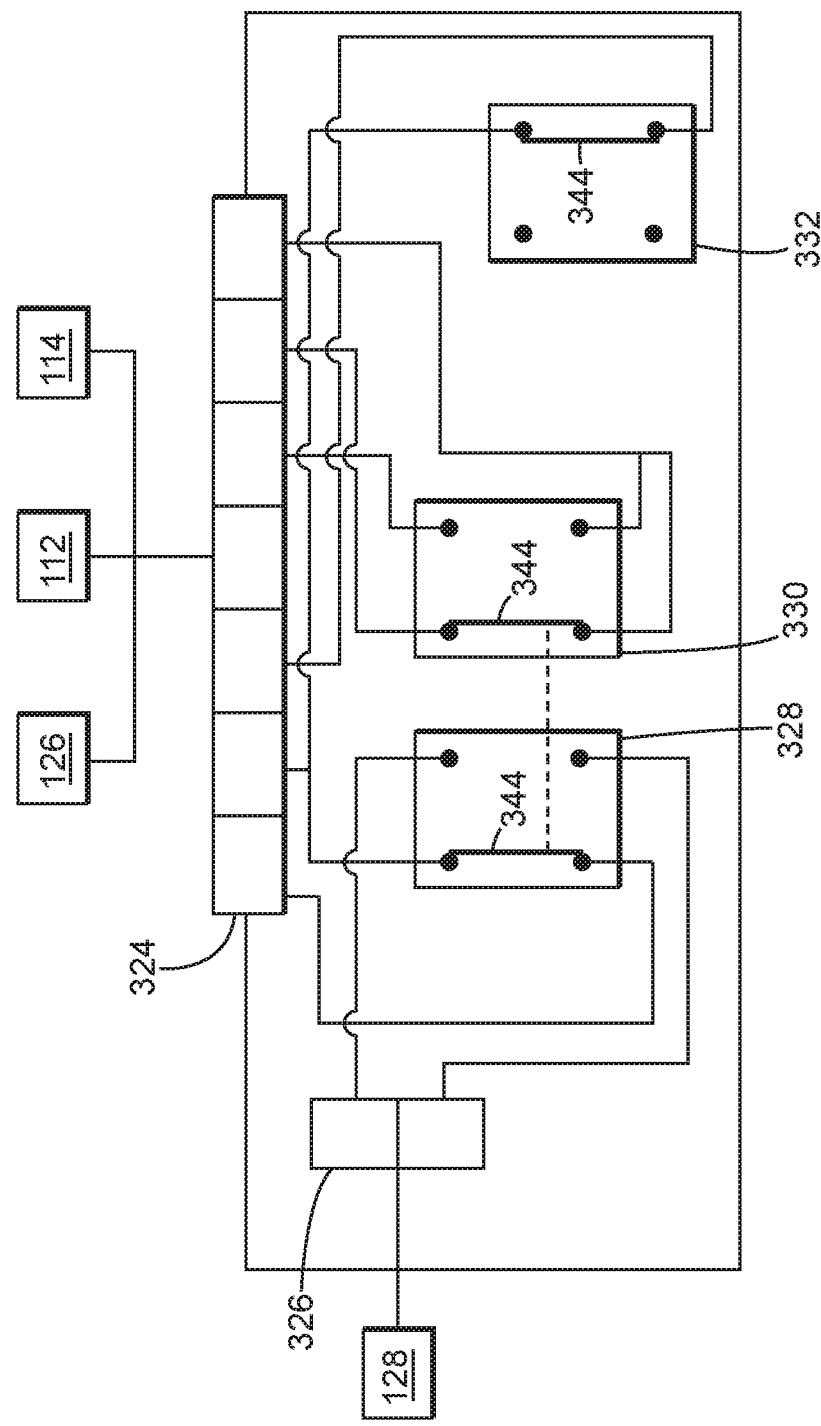
FIG. 13 depicts a schematic diagram of an example of a switch board for use in the switch actuator of FIG. 7.
Figure 14:
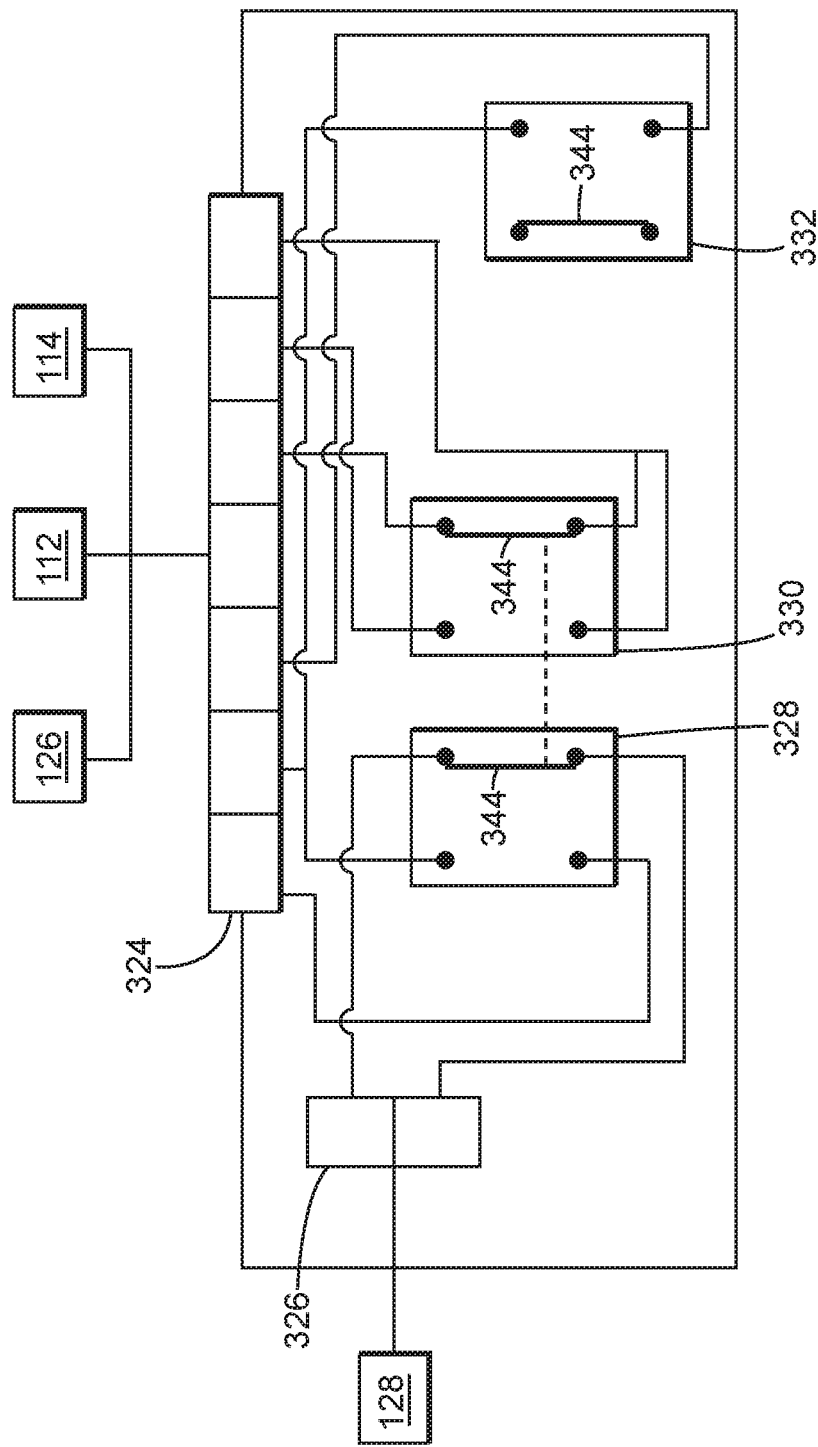
FIG. 14 depicts a schematic diagram of an example of a switch board for use in the switch actuator of FIG. 7.
Figure 15:
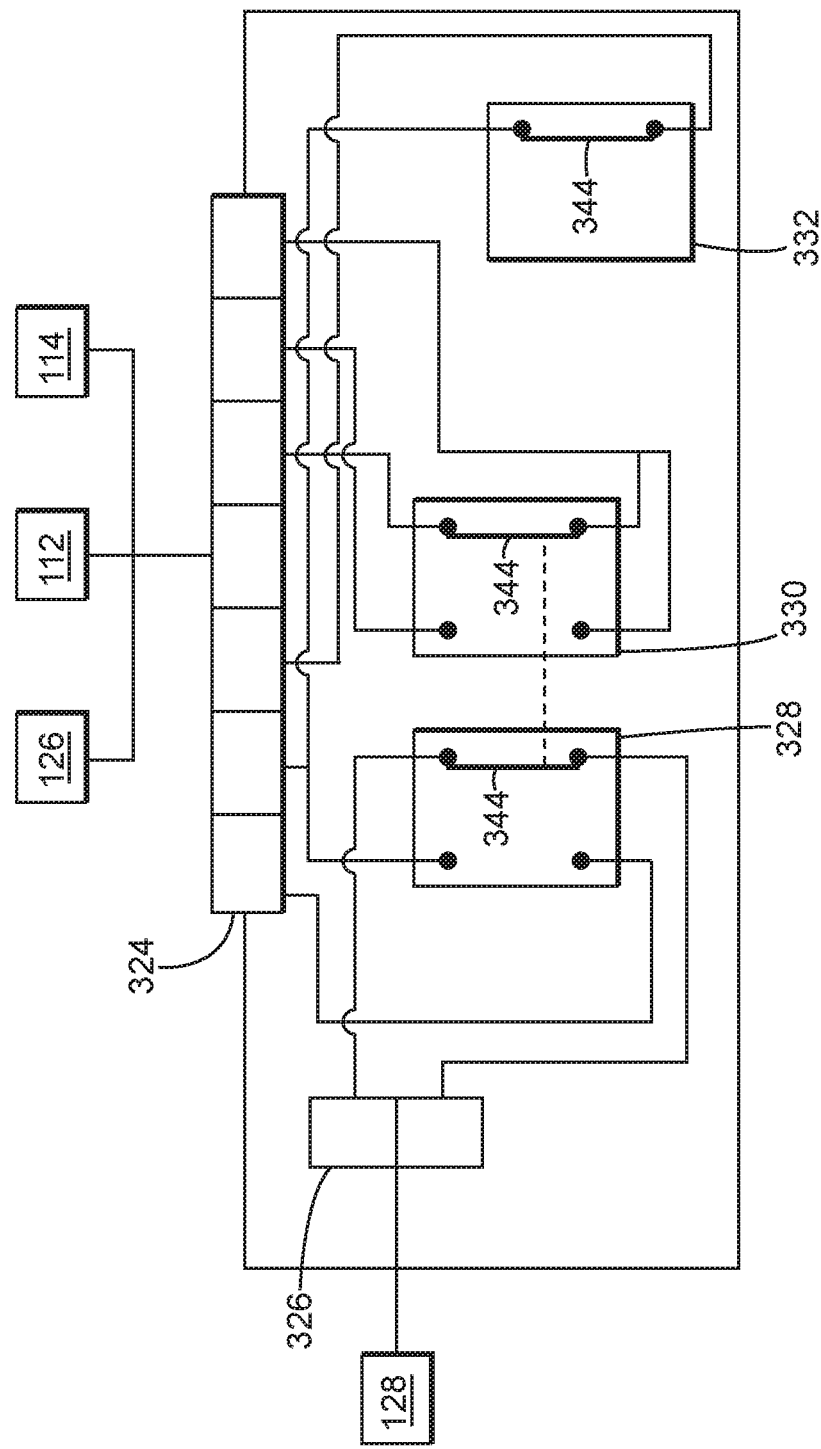
FIG. 15 depicts a schematic diagram of an example of a switch board for use in the switch actuator of FIG. 7.

FIGS. 13, 14, and 15 illustrate a schematic diagram of the switch board 308 with switches 328, 330, 332 in states that correspond with the operating modes of the actuator 100. In the diagrams, the switches 328, 330, 332 include an actuator 344 that couples terminals of the devices to create the electrical circuit discussed herein. The first connector 324 (also, "pin-out connector 324") can couple with the motor 112, the brake 114, and the power supply 126. The second connector 326 (also, "feedback connector 326") can couple with the process controller 128. In operation, the technician can manipulate the lever 154 to cause the elongated rod 316 to change the state of the switches 328, 330, 332 as between, for example, a first state and a second state. These states configure circuit board 318 to direct power across to pins on the pin-out connector 324 in a manner that sets the operating mode for the actuator 100.

The states correspond with non-use, use, and transitioning of the manual drive 120 (FIG. 1). In FIG. 13, the switches 328, 330, 332 assume states that correspond with "non-use" of the manual drive 120 (FIG. 1) for normal or automated movement of the actuator 100. These states may correspond with the first elevation of the elongate rod 316 as shown in FIG. 10. The switches 328, 330, 332 are set for the external input to power the motor 112 and to allow normal functions of the brake 114. The switches 328, 330, 332 are also set to de-couple the feedback connector 326 so as to prevent the feedback signal from the process controller 128. FIG. 14 shows the switches 328, 330, 332 in states that correspond with "use" of the manual drive 120 (FIG. 1) to operate or manually move the actuator 100. These states may correspond with the second elevation of the elongate rod 316 as shown in FIG. 11. The switches 328, 330, 332 are set to disengage both the motor 112 and the brake 114. The switches 328, 330, 332 are also set to couple the feedback connector 326 to generate the feedback signal to the process controller 128. FIG. 15 shows the switches 328, 330, 332 in states that correspond with "transitioning" of the manual drive 120 (FIG. 1) between "non-use" and "use" by way of movement (e.g., rotation) of the lever 154 to change the elevation of the elongate rod 216 between its first elevation and its second elevation. The switches 328, 330, 332 are set to disengage the motor 112 and to engage the brake 114. This configuration prevents release of energy stored in energy storage device 116 (FIG. 1). The switches 328, 330, 332 are also set to generate the feedback signal to the process controller 128.

Figure 16:
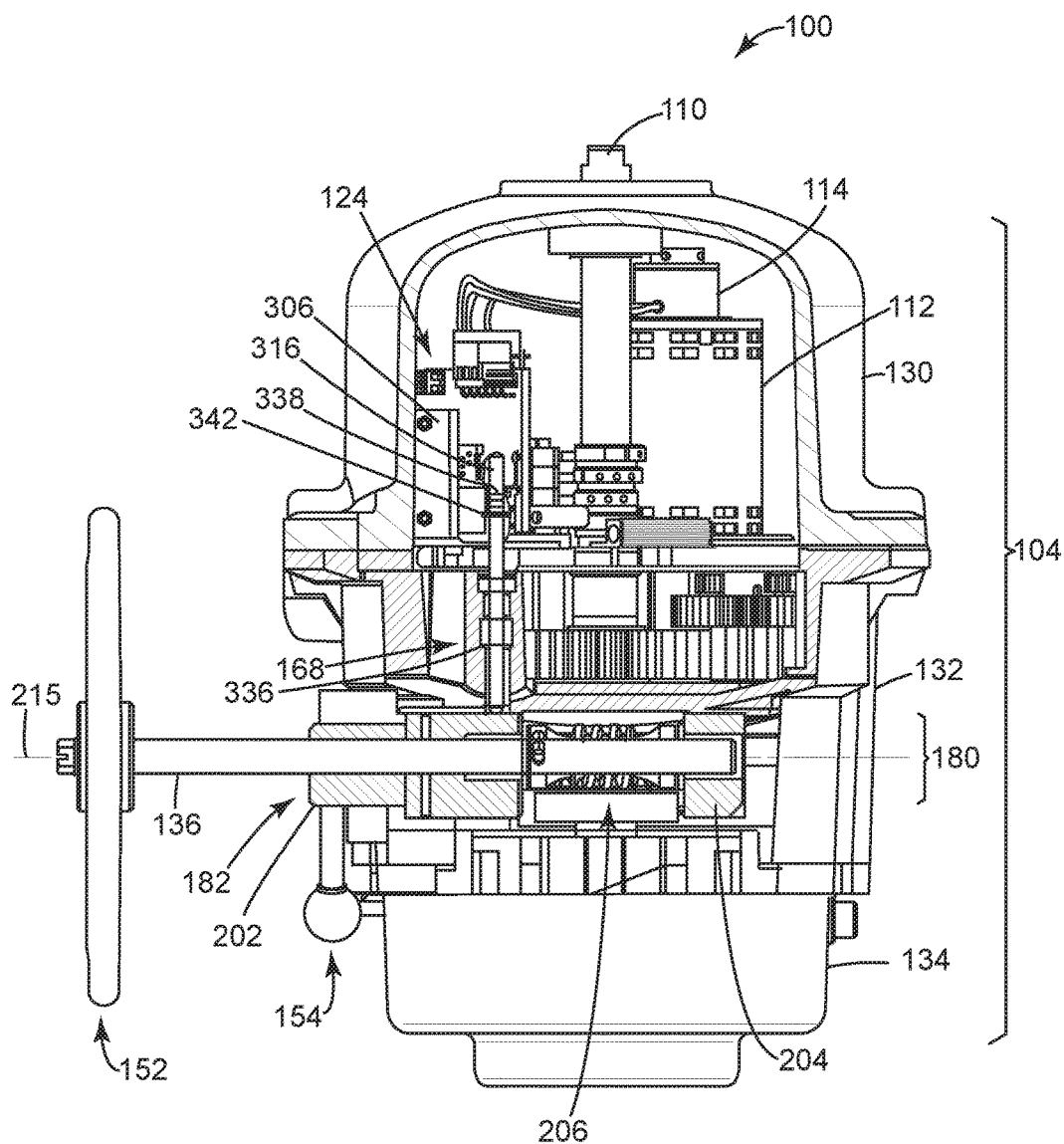
FIG. 16 depicts an elevation view of the cross-section of the actuator of FIG. 2 in assembled form.

FIG. 16 depicts the cross-section of the actuator 100 of FIG. 2 in assembled form. The bushing 336 can insert into the boss 168 to reside against the shoulders 178. The boss 168 may also be configured to receive the retaining devices 342. These configurations may include grooves, for example, that are in proximity to the shoulders 178. The elongated rod 316 extends through the boss 168 to reside on or in contact with an area of the second bushing 212, preferably on the outer surface 232 or the profiled surface 230 of the second recess 228. Dimensions for this area may depend on the orientation of the second bore 214. In this connection, the bearings 202, 204 may insert into the first bore 182 of the second housing member 132 to reside in the support structure 180. The second bearing 204 may receive the end of the shaft 136. The first bearing 202 extends out of the second housing member 132 enough to position the lever 154 between the surfaces 148, 150 (FIG. 2) on the hard stop 140.

Figure 17:
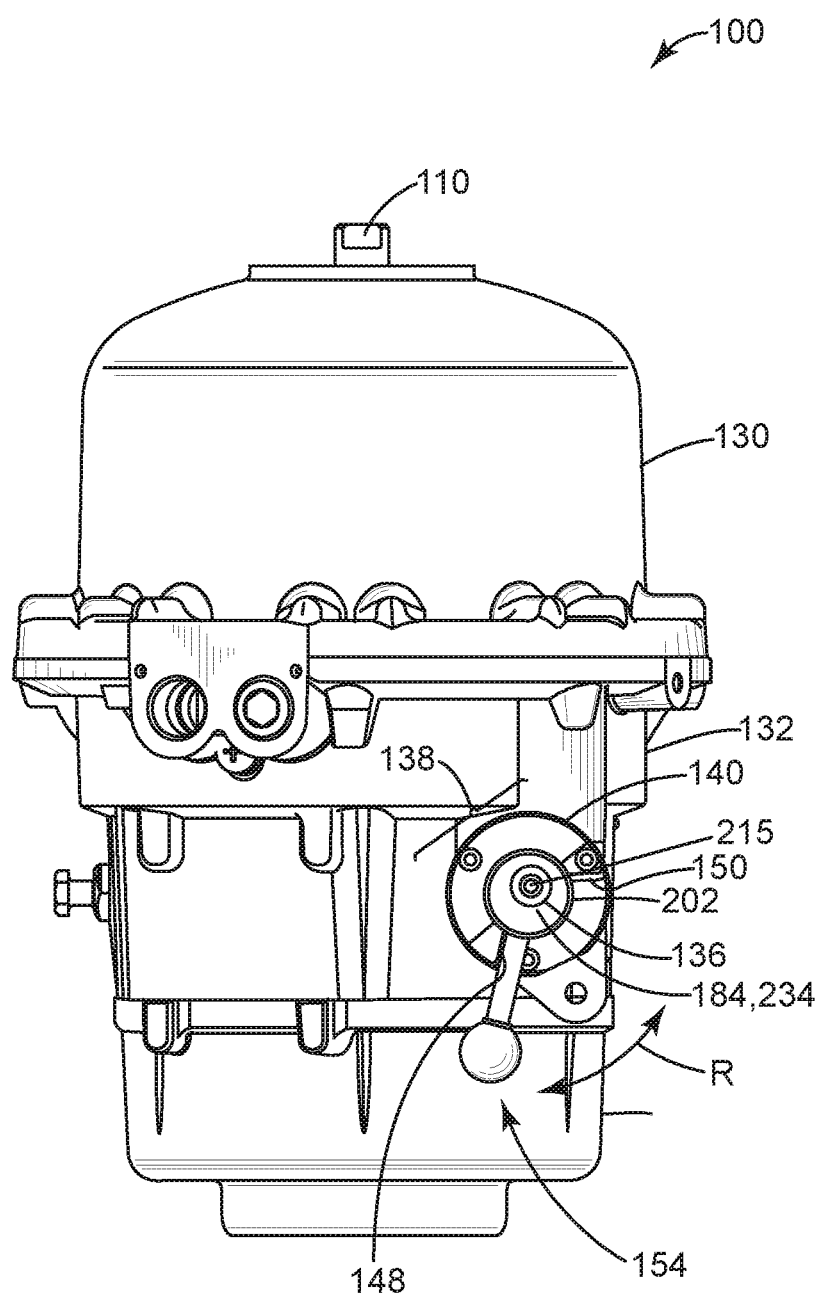
FIG. 17 depicts an elevation view of the side of the actuator of FIG. 2.
Figure 18:
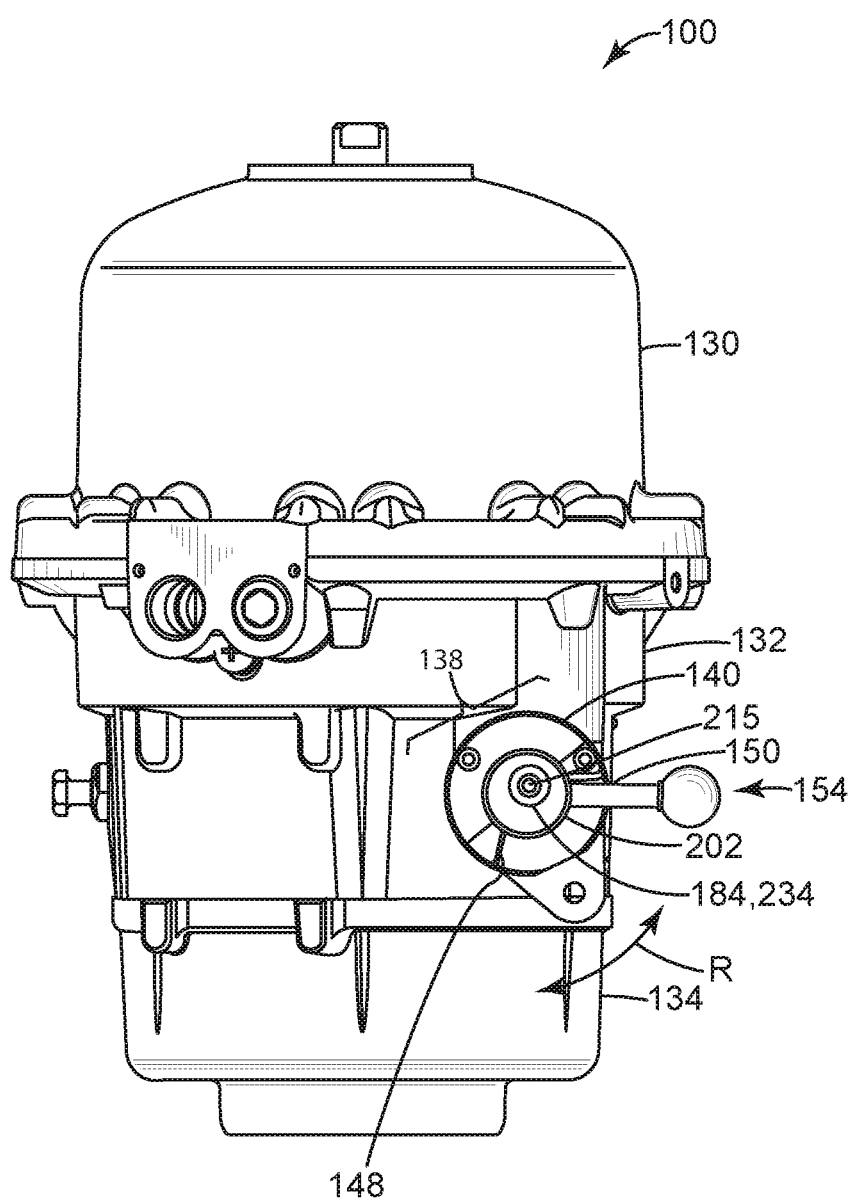
FIG. 18 depicts an elevation view of the side of the actuator of FIG. 2.

FIGS. 17 and 18 depict an elevation view of the side of the actuator 100 of FIG. 2 in partially-assembled form with the handwheel 152 removed from these figures for clarity. Referring first to FIG. 17, the center 234 of the bearings 202, 204 aligns with the first axis 184 of the first bore 182 on the second housing member 132. The second axis 215, formed by the first bearing 202 and other components of the gear assembly 200, is offset from the first axis 184. This configuration results in lateral movement of the shaft 136 in response to motion or displacement of the lever 154. This displacement effectively rotates the gear assembly 138 about the first axis 184, as generally denoted by the arrow enumerated R. Rotation R changes the position of the lever 154 relative to the surfaces 148, 150 on the hard stop 140. The lever 154 may come into contact the surface 148, 150 to limit rotation R within the confines of the open region between stops 18, 150.

The size of the gap 196 (FIG. 4) and elevation of the elongated rod 316 (FIGS. 10, 11, 12) may correspond with the position of the lever 154 in the open region 146. FIG. 17 depicts the lever 154 in a first radial position (e.g., proximate the first surface 148) that defines the size of the gap 196 (FIG. 4) to disengage (or prevent engagement of) the gear sections 188, 194. As noted herein, the actuator 100 will operate in its normal mode, with "non-use" of the manual drive 120. FIG. 18 shows the lever 154 in a second radial position (e.g., proximate the second surface 150) that defines the size of the gap 196 (FIG. 4) to engage (or cause engagement of) the gear sections 188, 194. This configuration will allow use of the manual drive 120 for manual operation of the output shaft 110 via the handwheel 152 (FIG. 6). In one implementation, a ball detent device may be used to secure the lever 154 in one or both of the first radial position and the second radial position.

Figure 19:
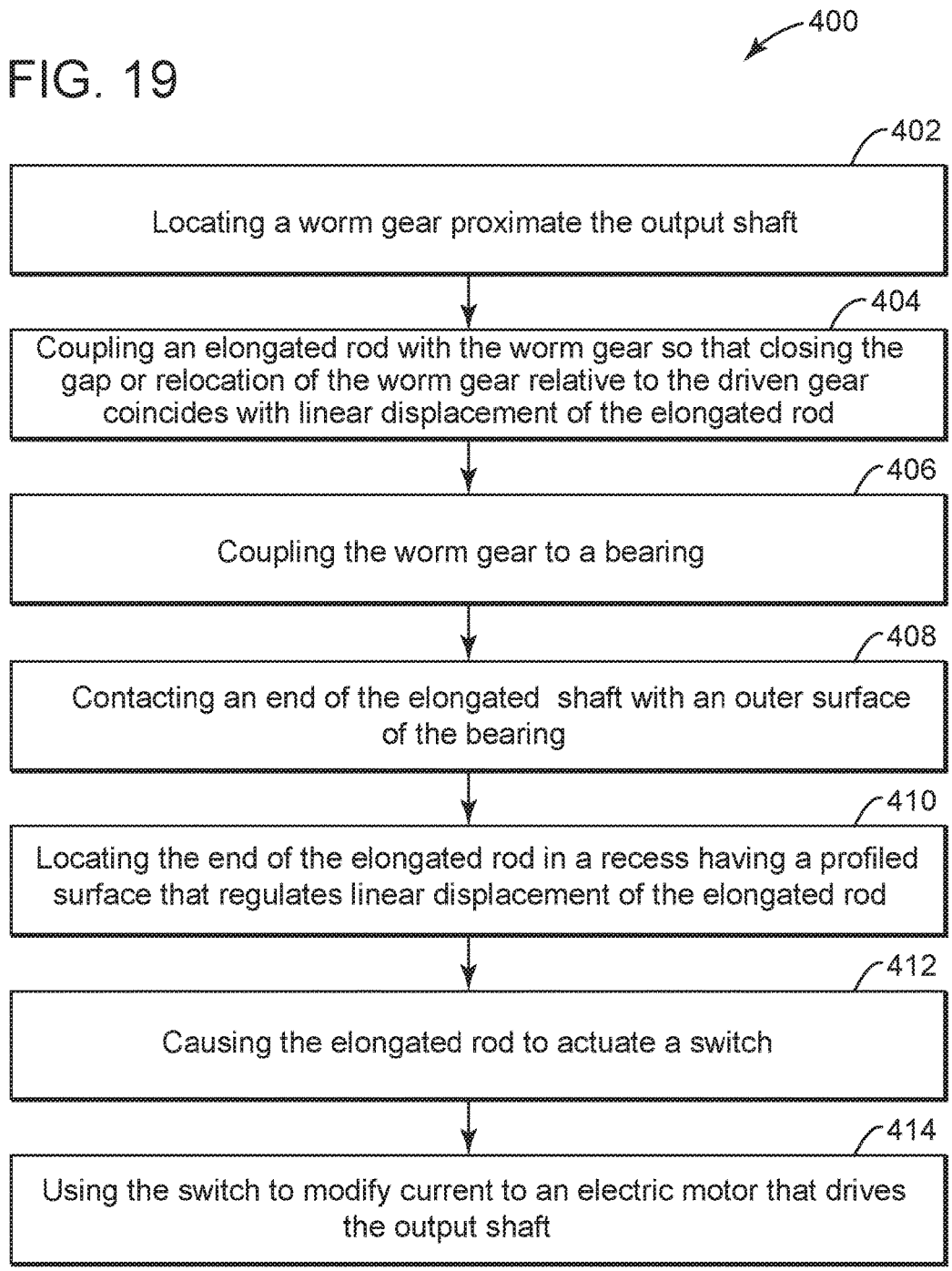
FIG. 19 depicts a flow diagram of an exemplary embodiment of a method for configuring an actuator with a manual drive.

FIG. 19 depicts a flow diagram of an exemplary embodiment of a method 400. The method 400 may include, at stage 402, locating a worm gear proximate the output shaft and, at stage 404, coupling an elongated rod with the worm gear so that closing the gap 196 or relocation of the drive or worm gear 206 relative to the driven gear 186 coincides with linear displacement of the elongated rod. The method 400 may also include, at stage 406, coupling the worm gear to a bearing, at stage 408, contacting an end of the elongated rod with an outer surface of the bearing, and, at stage 410, locating the end of the elongated rod in a recess having a profiled surface that regulates linear displacement of the elongated rod. The method 400 may further include, at stage 412, causing the elongated rod to actuate a switch. In one implementation, the method 400 may include, at stage 414, using the switch to modify current to an electric motor that drives the output shaft.

Figure 20:
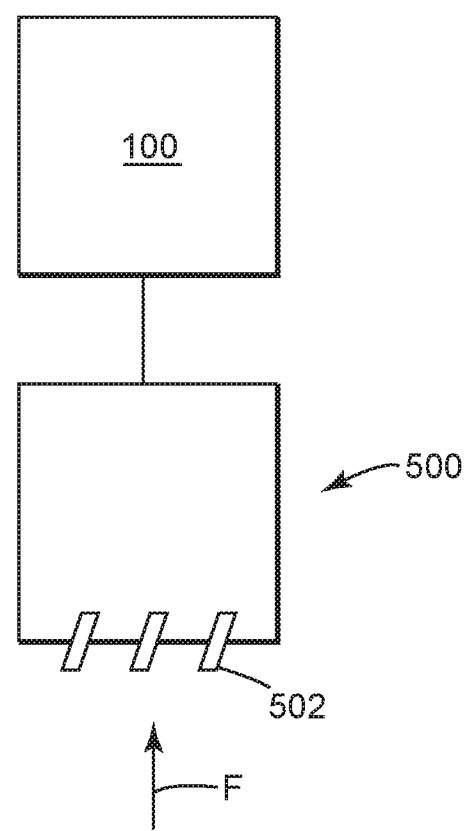
FIG. 20 depicts a schematic diagram of one application of the actuator of FIGS. 1 and 2 with a damper.
Figure 21:
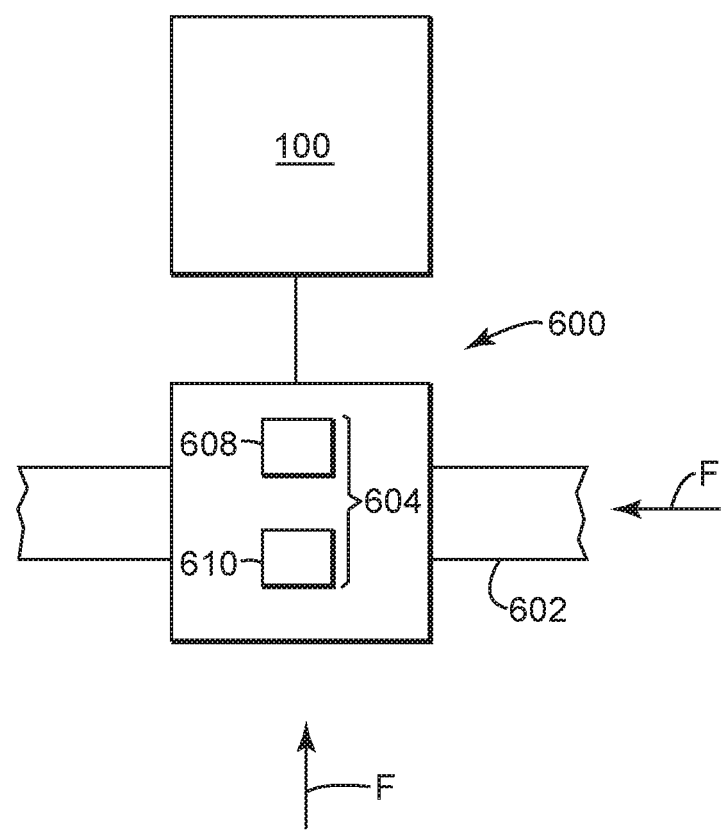
FIG. 21 depicts a schematic diagram of one application of the actuator of FIGS. 1 and 2 with a valve assembly.

FIGS. 20 and 21 illustrate schematic diagrams of the actuator 100 in different applications with examples a damper 500 (FIG. 20) and a valve assembly 600 (FIG. 21) that may benefit from these safety features. In FIG. 20, the damper 500 has louvers 502. The actuator 100 may open and close the louvers 502 to manage flow of fluid F (typically air) as part of heating, ventilation, and air conditioning (HVAC) systems. FIG. 21 shows the valve assembly 600 in communication with a conduit 602. Examples of the conduit 602 may serve as part of a pipeline that carries fluid F (e.g., oil, natural gas, or hydrocarbons, generally,) or as part of piping of a process line that transfers fluid F for use in a process. In this regard, the actuator 100 may couple with a valve 604 having a valve stem 606 interposed therebetween. The valve stem 606 can be configured to cause the actuator 100 to move a closure member 608 relative to a seat 610 on the valve 604. For purposes of the present example, the closure member 608 can embody a plug, typically a solid or piece part device that can engage with the seat 610 to prevent flow of fluid F through the valve 604.

This disclosure considers that devices like the actuator 100 may require service and maintenance to attend to its parts. Over time, parts may experience wear and, possibly, damage that can frustrate operation of the actuator 100. A technician may need to extract these parts, either in whole or in pieces, to remove existing parts in favor of one or more replacement parts. The replacement parts may originate from an OEM or alternative aftermarket dealer and/or distributor. Examples of the replacement parts may be newly constructed using any of the conventional manufacturing and machining techniques (including additive manufacturing). For certain techniques, a model file that comprises one or more instructions of executable code (on a storage media and/or downloadable and/or executable) may be used to define the features of the replacement part. These instructions may cause a machine (e.g., a lathe, milling machine, 3-D printing machine) to perform certain functions to result in parts for use in the actuator 100.

One or more of the replacement parts for the actuator 100 may be formed by existing parts. These existing parts may lend themselves to refurbishing and like processes useful to reclaim structure into condition and/or to meet specifications for use as the replacement part in the structure. Refurbishing may utilize additive and subtractive manufacturing processes like buffing, bead-blasting, machining, and like practices that are useful to build-up and/or remove material from the part, as desired. Exemplary additive manufacturing processes may include 3-D printing with polymers, laser metal sintering, as well as after-developed technology.

The replacement parts may be assembled into the actuator 100 as a wholly-constructed assembly. In other implementations, the replacement parts may embody individual parts, as well as combinations and compilations thereof, possibly in the form of one or more sub-assemblies.

Figure 22:
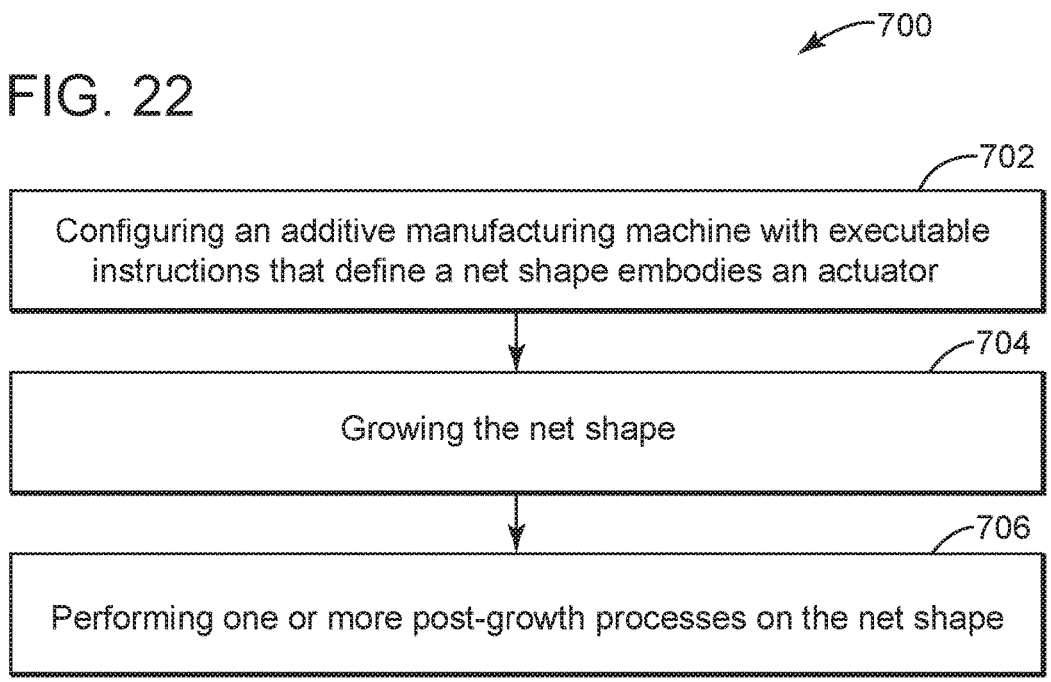
FIG. 22 depicts a flow diagram of an exemplary embodiment of a process for manufacturing parts of the actuator of FIGS. 1 and 2.

FIG. 22 illustrates an exemplary process 700 to manufacture an example of the individual parts. The exemplary process may leverage additive manufacturing techniques, alone or in combination with one or more other types of subtractive manufacturing techniques. The process 700 can include, at stage 702, configuring an additive manufacturing machine with executable instructions that define a net shape. The net shape can embody the part, in whole or in part, including, for example, configurations of the parts for the actuator 100 described hereinabove. The process 700 can also include, at stage 704, growing the net shape and, where necessary, at stage 706, performing one or more post-growth processes on the net shape.

Implementations of the process 700 and related assembly techniques can render embodiments of the actuator 100. These implementations may result in, for example, a housing or a bearing made by the process of configuring an additive manufacturing machine with executable instructions that define a net shape, growing the net shape, and performing one or more post-growth processes on the net shape. Such implementations that result in the housing or the bearing are also contemplated wherein the one or more post-growth processes comprises one or more of heat treating the net shape, deburring the net shape, machining the net shape, applying a surface finish to one or more surfaces of the net shape, removing material of the net shape using abrasives, and inspecting the net shape to accumulate dimensional data and comparing the dimensional data to a default value.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In light of the foregoing discussion, the embodiments herein incorporate improvements to prevent damage to components in actuators that permit manual operation of process devices. These improvements may find particular use with spring-return actuators that include components to spring-load an output shaft, but the concepts herein may have wider application over only this type of actuator. In this regard, the examples below include certain elements or clauses one or more of which may be combined with other elements and clauses describe embodiments contemplated within the scope and spirit of this disclosure.

What is claimed is:

1. An actuator, comprising:
   an output shaft;
   a drive assembly coupled with the output shaft, the drive assembly comprising a motor and a brake;
   an override device coupled with the output shaft, the override device comprising a gear assembly and a switch actuator; and
   a housing forming an enclosure about at least the gear assembly and the switch actuator,
   wherein the switch actuator is configured to modify an external input to the drive assembly in response to relocation of the gear assembly relative to the output shaft between a first position and a second position so as to connect the motor and the brake to the external input at the first position, to disconnect both the motor and the brake from the external input at the second position, and to disconnect the motor from the external input and apply the external input to the brake during transition between the first position and the second position.

2. The actuator of claim 1, wherein the gear assembly has a part that extends outside of the enclosure and is configured to receive a force to relocate the gear assembly.

3. The actuator of claim 1, wherein the gear assembly comprises a bearing with a profiled surface that is configured to receive part of the switch actuator.

4. The actuator of claim 1, wherein the external input comprises current available at the motor and the brake and relates to linear displacement of an elongated rod.

5. The actuator of claim 4, wherein the current available at the motor corresponds with a state of a switch disposed in the housing and actuated in response to movement of the gear assembly.

6. The actuator of claim 1, further comprising a lever movable to relocate the gear assembly between the first position and the second position.

7. The actuator of claim 1, further comprising a spring disposed in the enclosure and coupled with the output shaft.

* * * * *